(12) United States Patent
Maganti et al.

(10) Patent No.: US 9,143,914 B2
(45) Date of Patent: Sep. 22, 2015

(54) EMERGENCY CALL OPTIMIZATION DURING TRACKING AREA UPDATE

(71) Applicant: QUALCOMM Incorporated, San Diego, CA (US)

(72) Inventors: Nagaraja Kumar Maganti, Hyderabad (IN); Bera Asimava, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 60 days.

(21) Appl. No.: 13/842,371

(22) Filed: Mar. 15, 2013

(65) Prior Publication Data

US 2013/0288634 A1     Oct. 31, 2013

Related U.S. Application Data

(60) Provisional application No. 61/639,819, filed on Apr. 27, 2012.

(51) Int. Cl.
| | |
|---|---|
| *H04M 11/04* | (2006.01) |
| *H04W 4/00* | (2009.01) |
| *H04W 36/00* | (2009.01) |
| *H04W 4/22* | (2009.01) |
| *H04W 76/00* | (2009.01) |
| *H04W 60/00* | (2009.01) |

(52) U.S. Cl.
CPC ............... *H04W 4/22* (2013.01); *H04W 76/007* (2013.01); *H04W 36/0022* (2013.01); *H04W 60/00* (2013.01)

(58) Field of Classification Search
CPC ... H04W 36/0022; H04W 4/22; H04W 60/00; H04W 76/007

USPC ................. 455/404.1, 404.2, 436; 370/331
See application file for complete search history.

(56) References Cited

U.S. PATENT DOCUMENTS

| | | | |
|---|---|---|---|
| 2010/0297979 A1* | 11/2010 | Watfa et al. | ................. 455/404.1 |
| 2011/0028120 A1 | 2/2011 | Wu | |
| 2011/0103277 A1 | 5/2011 | Watfa et al. | |
| 2011/0149908 A1* | 6/2011 | Olsson et al. | ................. 370/331 |
| 2012/0002545 A1 | 1/2012 | Watfa et al. | |
| 2012/0034898 A1 | 2/2012 | Tiwari | |
| 2012/0218889 A1 | 8/2012 | Watfa et al. | |

OTHER PUBLICATIONS

"3rd Generation Partnership Project; Technical Specification Group Core Network and Terminals; Non-Access-Stratum (NAS) protocol for Evolved Packet System (EPS); Stage 3 (Release 10)", 3GPP Standard; 3GPP TS 24.301, 3rd Generation Partnership Project (3GPP), Mobile Competence Centre; 650, Route Des Lucioles ; F-06921 Sophia-Antipolis Cedex ; France, vol. CT WG1, No. V10. 6.1, Mar. 16, 2012, pp. 1-322, XP050580266, [retrieved on Mar. 16, 2012] 5.6.1.2.

(Continued)

*Primary Examiner* — Opiribo Georgewill
(74) *Attorney, Agent, or Firm* — Arent Fox LLP

(57) ABSTRACT

Systems and methods for handling requests for emergency calls are disclosed. In particular, the emergency calls may be expedited when a tracking area update is in progress. An extended service request is transmitted by a user equipment while performing a tracking area update, the request relating to an emergency call. A circuit-switched fallback procedure may be performed before completion of the TAU.

34 Claims, 14 Drawing Sheets

(56) References Cited

OTHER PUBLICATIONS

3rd Generation Parternship Project; Technical Specification Group Services and Systems Aspects; Circuit Switched (CS) fallback in Evolved Packed System (EPS); Stage 2 (Release 9), 3GPP Standard; 3GPP TS 23.272, 3rd Generation Partnership Project (3GPP), Mobile Competence Centre ; 650, Route Des Lucioles ; F-06921 Sophia-Antipolis Cedex ; France, No. V9.3.0, Mar. 26, 2010, pp. 1-66, XP050402081, [retrieved on Mar. 26, 2010].

International Search Report and Written Opinion—PCT/US2013/032988—ISA/EPO—May 22, 2013.

3rd Generation Partnership Project; Technical Specification Group Services and System Aspects; Circuit Switched (CS) fallback in Evolved Packet System (EPS); Stage 2 (Release 9), 3GPP Standard; 3GPP TS 23.272, 3RD Generation Partnership Project (3GPP), Mobile Competence Centre; 650, Route Des Lucioles ; F-06921 Sophia-Antipolis Cedex; France, No. V9.3.0, Mar. 26, 2010, pp. 1-66,.

International Search Report and Written Opinion—PCT/US2013/032988—ISA/EPO—May 5, 2013.

"3rd Generation Partnership Project; Technical Specification Group Core Network and Terminals; Non-Access-Stratum (NAS) protocol for Evolved Packet System (EPS); Stage 3 (Release 10)", 3GPP Standard; 3GPP TS 24.301, 3RD Generation Partnership Project (3GPP), Mobile Competence Centre; 650, Route Des Lucioles; F-06921 Sophia-Antipolis Cedex; France, vol. CT WG1, No. V10.6.1, Mar. 16, 2012, pp. 1-322, XP050580266, [retrieved on Mar. 16, 2012] 5.6.1.2.

* cited by examiner

EMERGENCY CALL OPTIMIZATION DURING TRACKING AREA UPDATE

CROSS-REFERENCE TO RELATED APPLICATION(S)

This application claims the benefit of U.S. Provisional Application Ser. No. 61/639,819, entitled "Emergency Call Optimization During Tracking Area Update" and filed on Apr. 27, 2012, which is expressly incorporated by reference herein in its entirety.

BACKGROUND

1. Field

The present disclosure relates generally to communication systems, and more particularly, to a wireless communications system having multiple radio access technologies.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, systems and methods for handling requests for emergency calls are disclosed. In particular, the emergency calls may be expedited when a tracking area update (TAU) is in progress.

In an aspect of the disclosure, an extended service request (ESR) is transmitted while a TAU is being performed. The ESR may relate to an emergency call. A circuit-switched fallback (CSFB) procedure may be performed before completing the TAU. The TAU may be terminated prior to performing the CSFB procedure. The TAU may be terminated when an ESR response is received prior to receiving a TAU result. The TAU may be terminated when the TAU is not related to a change in tracking area (TA).

In an aspect of the disclosure, a new TAU may be scheduled. The new TAU may be performed after the CSFB procedure is completed. A CSFB procedure may include establishing a CSFB emergency call in response to the ESR, and performing a new TAU after the CSFB procedure is completed.

In an aspect of the disclosure, terminating the TAU may include ignoring a TAU response after transmitting the ESR. Terminating the TAU may include ignoring a TAU response after transmitting the ESR. Terminating the TAU may include ignoring a TAU response after initiating the CSFB procedure.

In an aspect of the disclosure, the ESR is buffered when the TAU is related to a change in TA. The TAU may be aborted when the TAU is determined to be not related to a change in TA. Transmitting the ESR may include delaying transmitting the ESR until the TAU is completed when the TAU is determined to be related to a change in TA. Transmitting the ESR may include buffering the ESR.

In an aspect of the disclosure, transmitting the ESR includes determining whether the TAU is related to a change in TA, aborting the TAU when the TAU is not related to the change in TA, and refraining from transmitting the ESR until completion of the TAU when the TAU is related to the change in TA.

DETAILED DESCRIPTION

Figure 1:
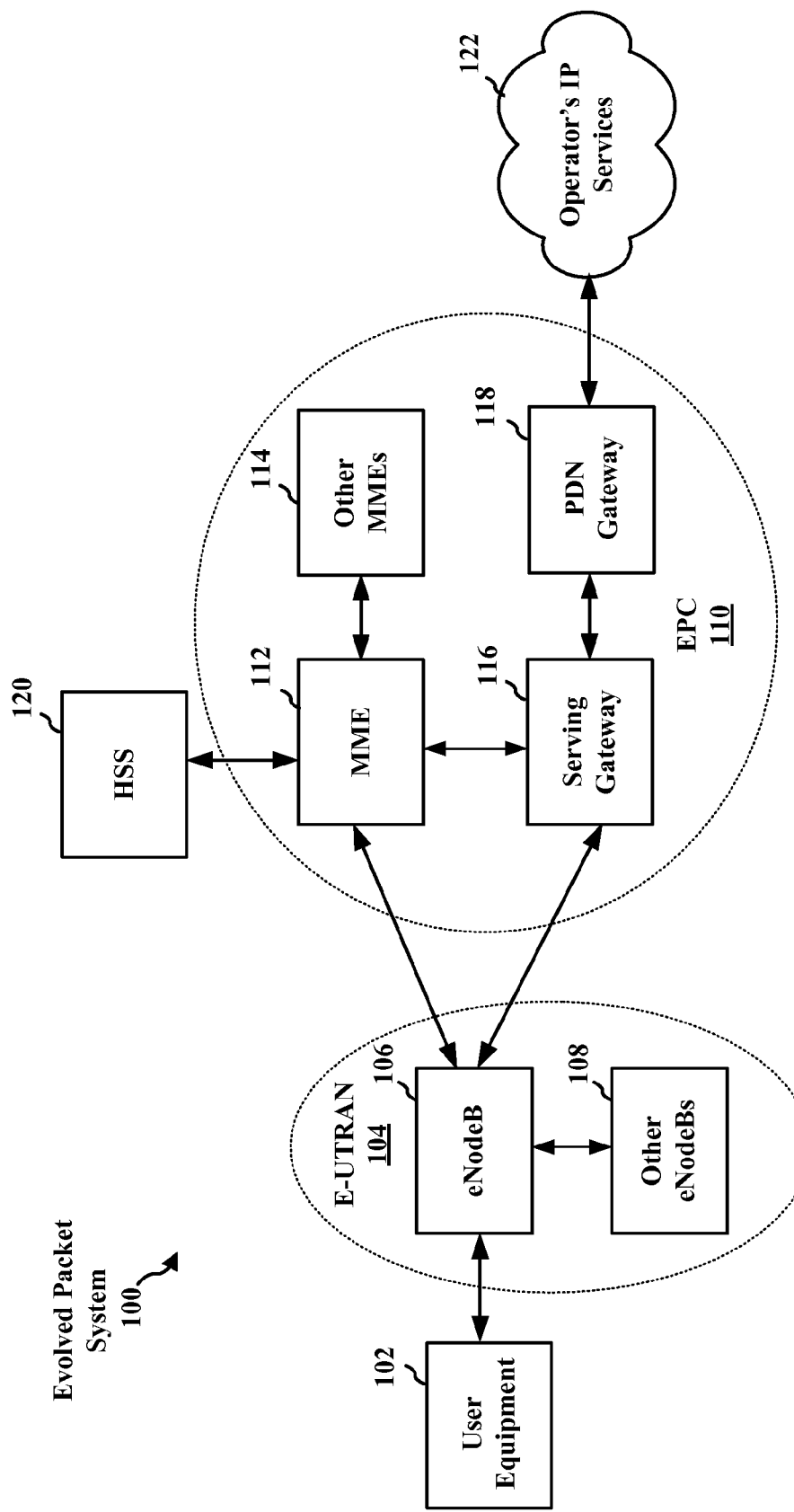
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 may include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
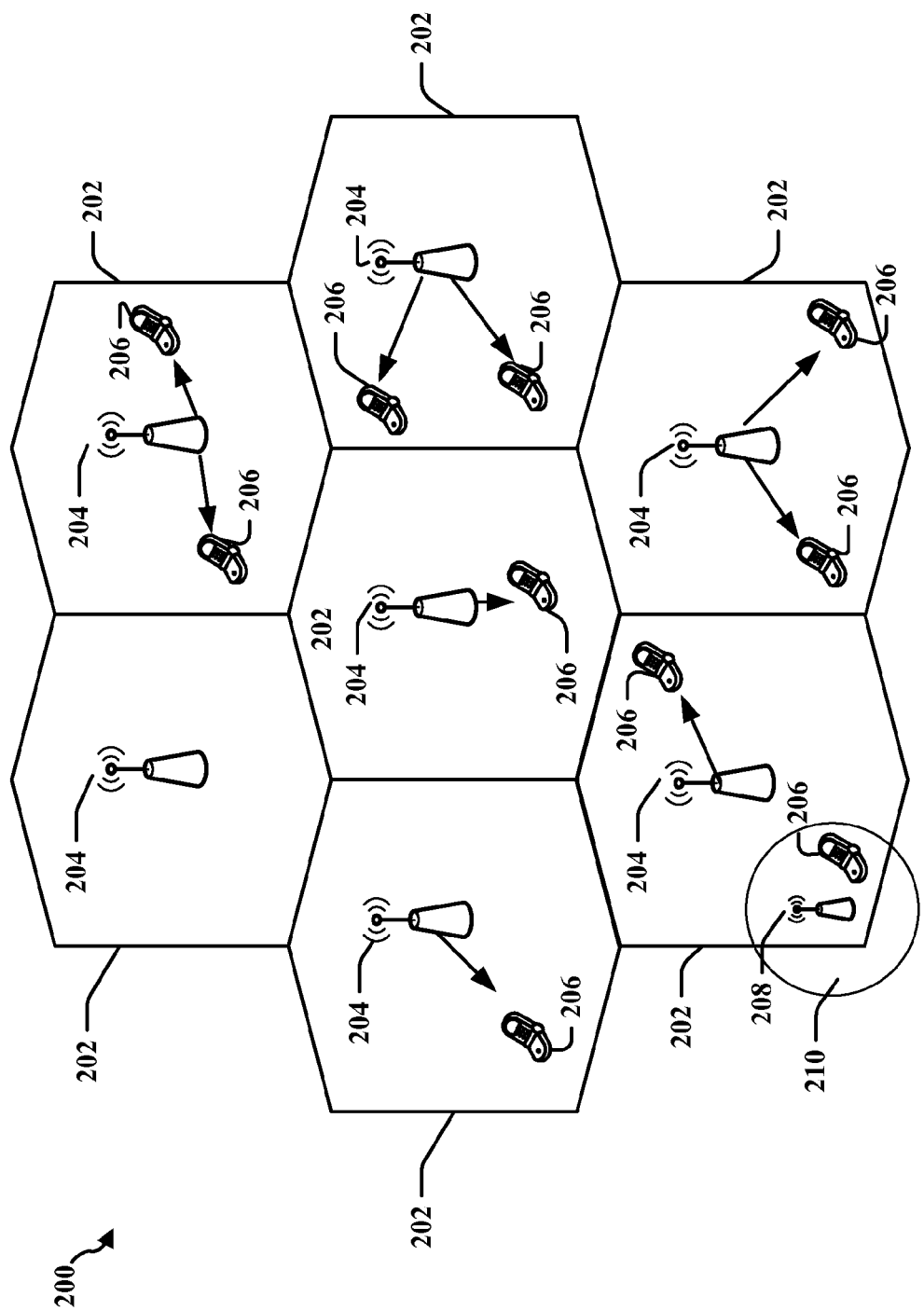
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the Serving Gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
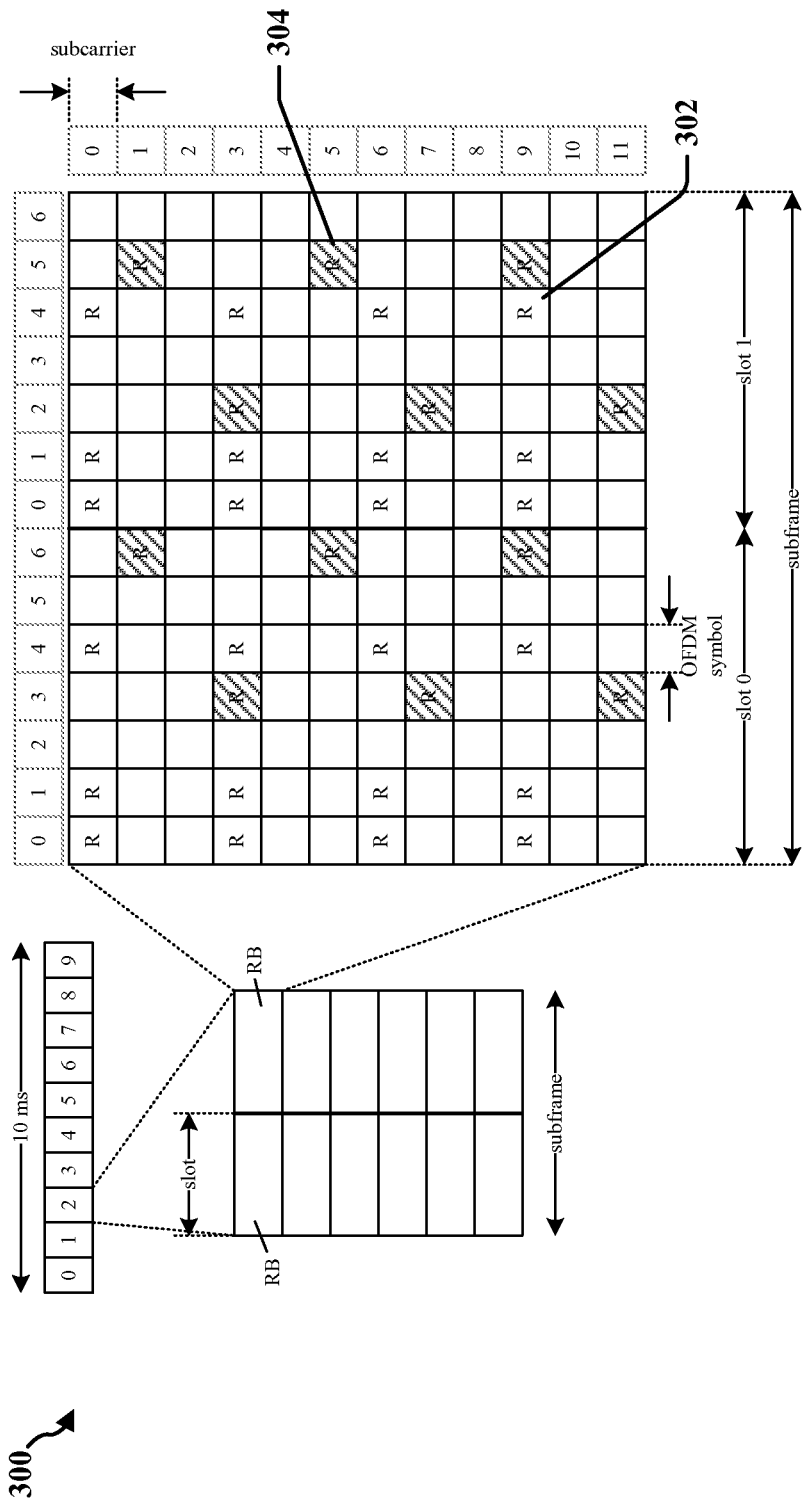
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
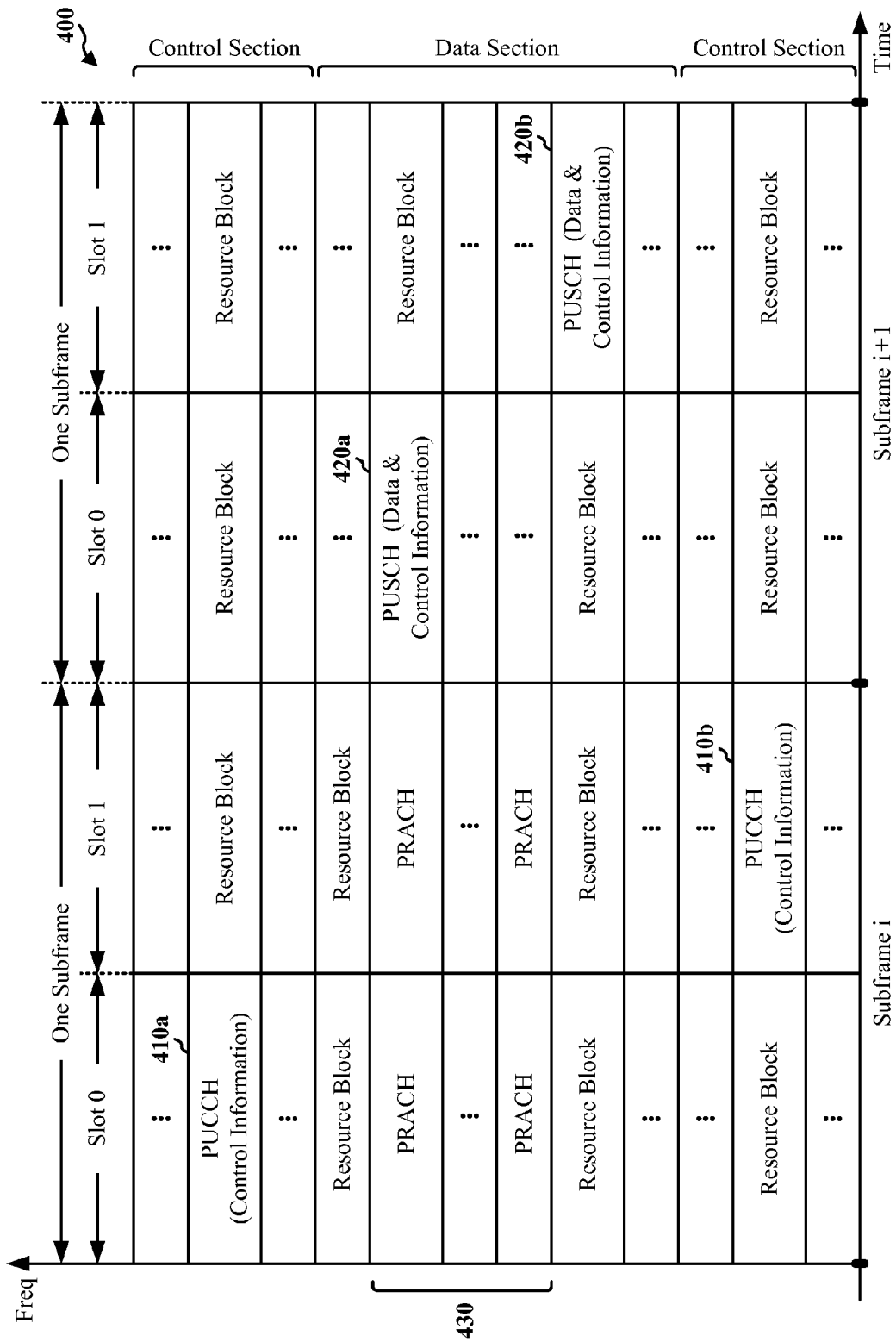
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
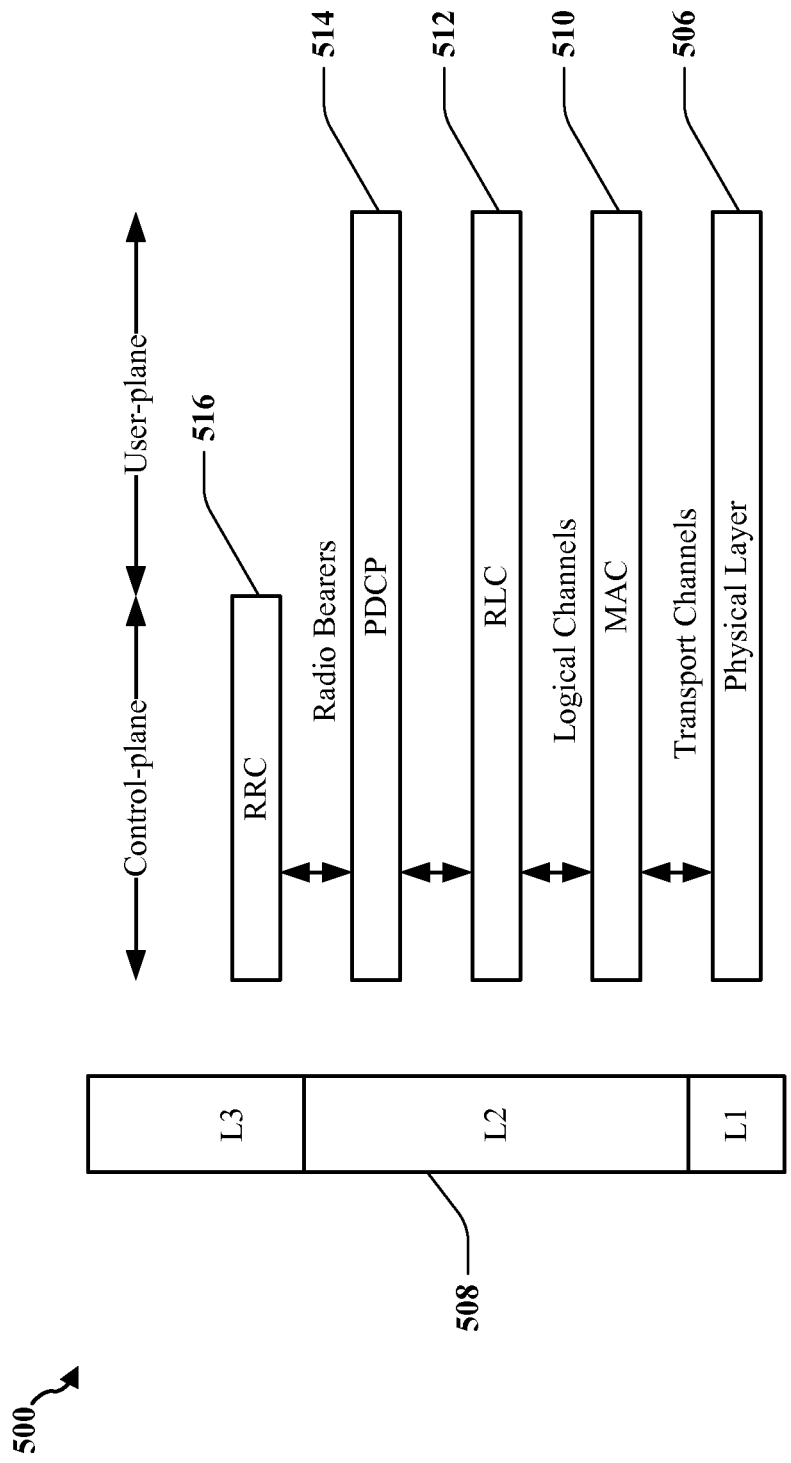
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
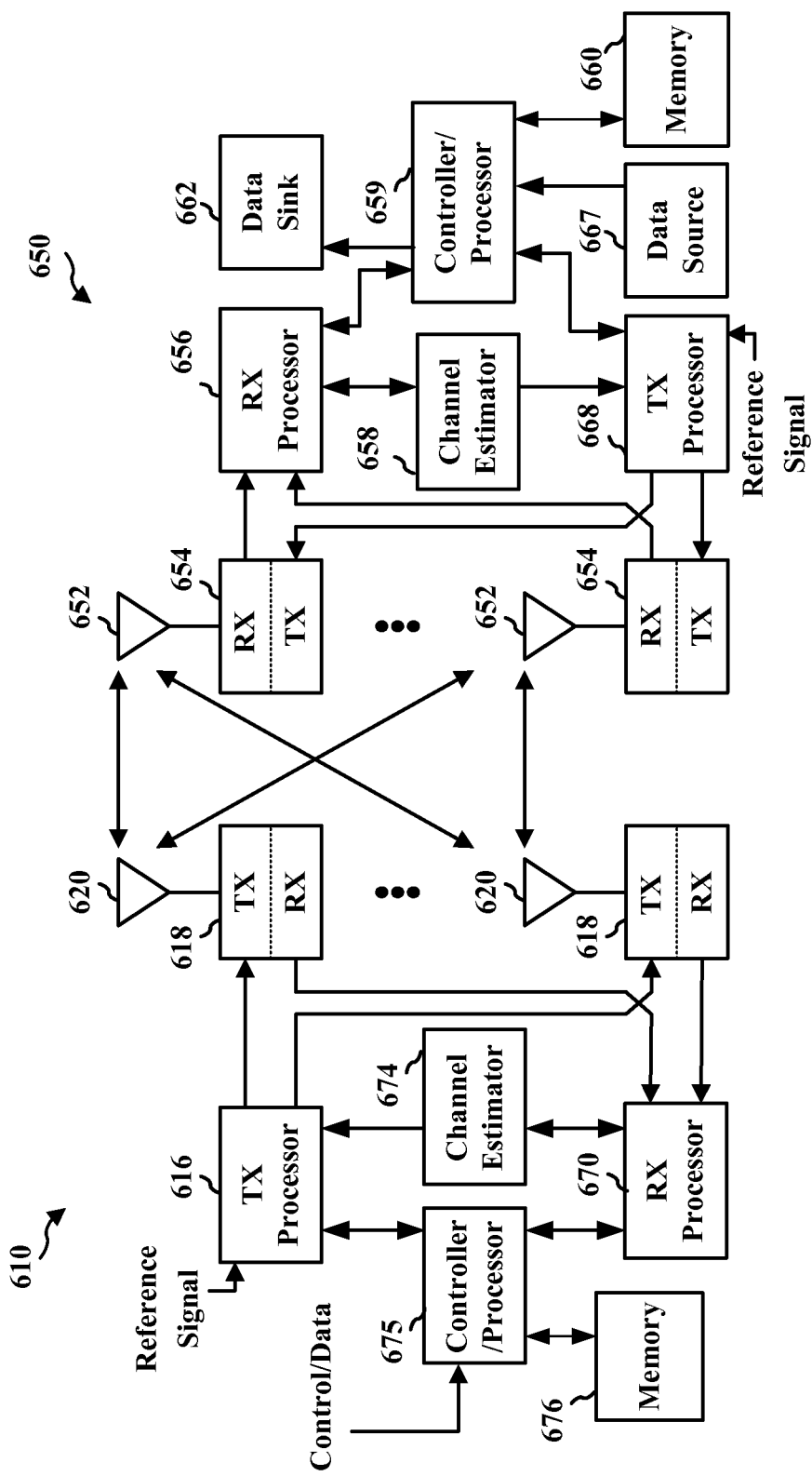
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
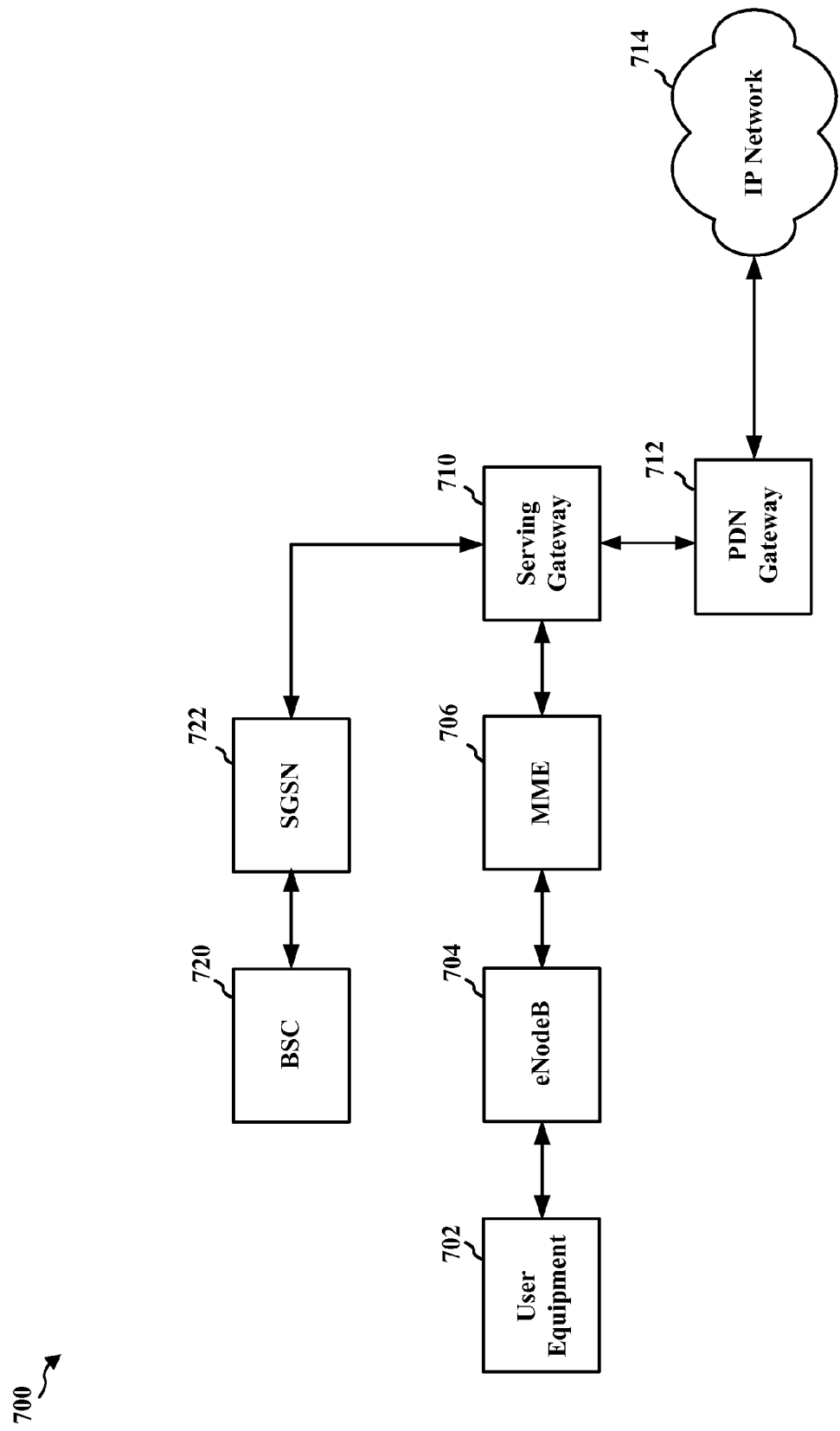
FIG. 7 is a diagram illustrating a multiple RAN architecture.

FIG. 7 is a diagram 700 illustrating a multiple RAN architecture. FIG. 7 depicts a simplified example in which a UE 702 is located within the coverage of multiple cells that use different frequencies and/or different radio access technologies (RATs) in a radio access network (RAN) to access a core network that provides mobility management, session management, transport for Internet Protocol packet services (e.g. through packet data network gateway 712 which is coupled to an IP network 714), and other services. A RAN may comprise ground-based infrastructure required for delivery of communication between UE 702 and the core network. In LTE, the RAN may comprise one or more eNBs 704. RATs may be based on UMTS, TD-SCDMA, GSM, CDMA2000 and WiMAX.

UE 702 may perform a mobility procedure that results in the UE 702 moving from a source cell to a target cell. The mobility procedure may include leaving the source cell to camp on the target cell, identifying characteristics of the target cell, establishing a connection on the target cell, receiving a grant on the target cell, and initiating a location update.

UE 702 may autonomously select a frequency and a RAT to camp on based on a priority list. This priority list may include a set of frequencies, a RAT associated with each frequency, and a priority of each frequency. For example, the priority list may include three frequencies X, Y and Z. Frequency X may be used for LTE and may have the highest priority, frequency Y may be used for GSM and may have the lowest priority, and frequency Z may be used for W-CDMA and may have medium priority. In general, the priority list may include any number of frequencies for any set of RATs and may be specific for the UE location. UE 702 may be configured to prefer LTE, when available, by defining the priority list with LTE frequencies at the highest priority and with frequencies for other RATs at lower priorities.

In one example, UE 702 may be able to receive packet-switched (PS) data services from an LTE network and may camp on the LTE network while in the idle mode. UE 702 may attempt to transfer to another wireless network of another RAT. For example, the UE 702 may initiate a circuit-switched fallback (CSFB) to initiate or receive voice calls. CSFB may be accomplished by IRAT redirection or handover executed by UE 702. For example, UE 702 may reselect a RAT that supports voice service, such as 1 xRTT, W-CDMA, GSM, or other RAT. UE 702 may transfer from an LTE network to another network if LTE service is lost, particularly when UE 702 physically moves through a coverage area of a communication system.

Mobility management (MM) functions may be provided to support UE 702 mobility, including for example non-access stratum (NAS) signaling and security, signaling between core network nodes for mobility between 3GPP access networks, packet data network gateway (P-GW) and serving gateway (S-GW) selection, and SGSN selection for handovers, and roaming and authentication. An EPS mobility management (EMM) process identifies and maintains communication connections to mobile devices that can move throughout or connect to different EPS networks. In one example, the EMM process sets an NAS state which reflects whether a UE 702 is registered with MME 706. UE 702 may have valid MM parameters from both an SGSN 722 and a MME 706, and/or another control node which processes the signaling between the UE 702 and the core network. The SGSN 722 is connected to a base station controller (BSC) 720 and a Serving Gateway 710. MME 706 may provide a visitor location register (VLR) for an EPS. For example, a "Temporary Identity used in Next update" (TIN) may be a parameter of an MM context of UE 702, which can identify the identity of the UE 702 used in a next RAU request, a tracking area update (TAU) request or attach request message.

A TAU may be performed for a number of reasons and the TAU is a procedure by which the UE 702 updates the network when the UE 702 changes location and it moves out of its current tracking area (TA). TAU is typically performed when UE 702 enters a new cell outside the current tracking area (TA). A TAU procedure may be relatively prolonged, and can last for periods of 15 seconds or more, particularly where the TAU process fails and is retried. When UE 702 initiates a TAU process for any reason, it may enter an EMM-TRACKING-AREA-UPDATING-INITIATED state. During TAU procedures, the EMM may buffer high level requests, such as extended service requests (ESRs), until the TAU procedure has completed. The ESR request may comprise a request by UE 702 to perform circuit-CSFB to initiate or receive voice calls. For example, the UE 702 may request CSFB for an emergency call.

In certain embodiments, UE 702 and/or MME 706 may be configured to process an ESR message corresponding to an emergency call without buffering, thereby avoiding unnecessary delays that may accrue if the ESR message was left unprocessed until completion of the TAU procedure. In some embodiments, emergency call processing can be accelerated during TAU processing, especially in cases when TAU is being performed for causes other TA change.

Figure 8:
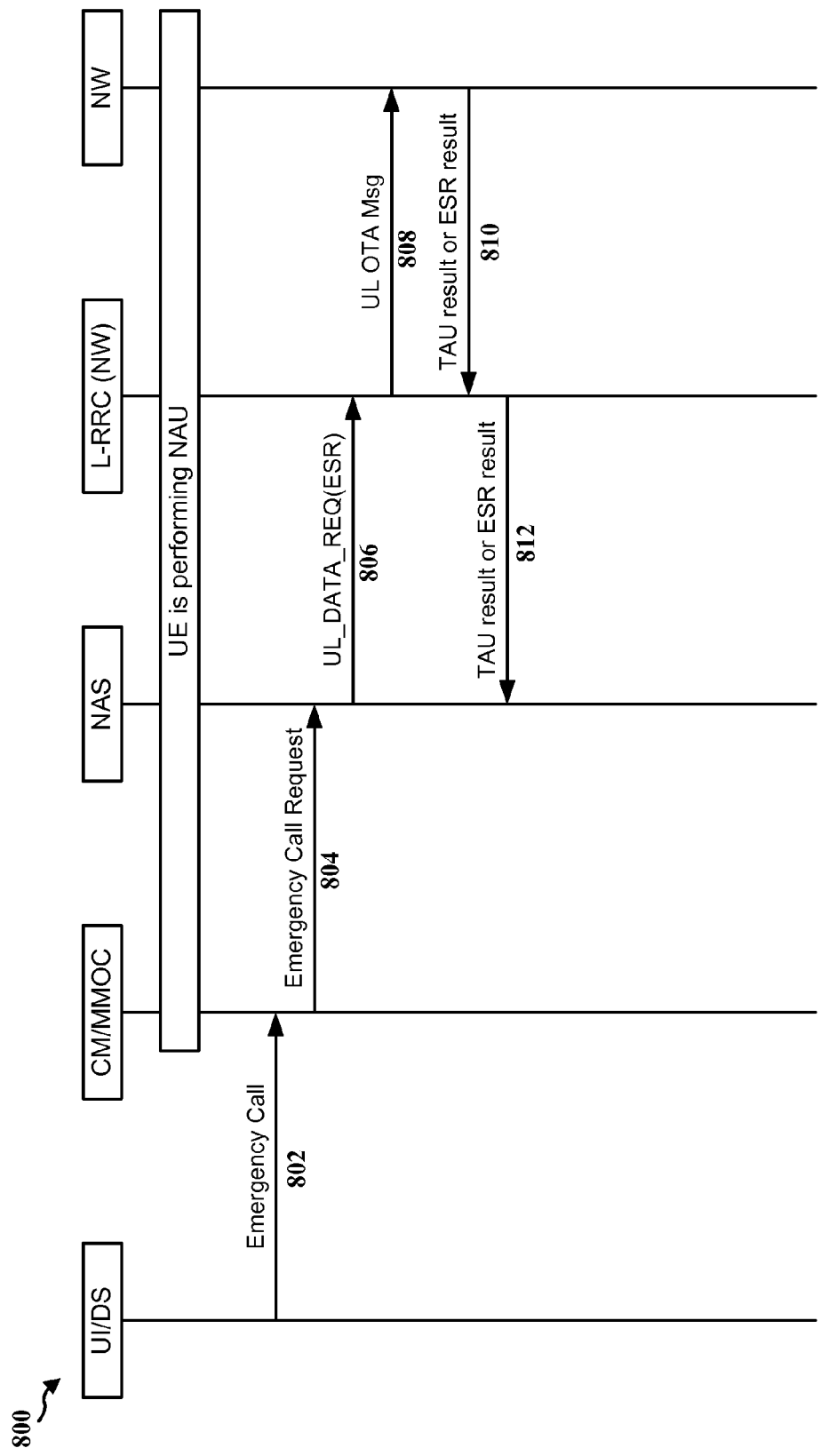
FIG. 8 is a call flow chart of a method of wireless communication.

FIG. 8 is a call flow chart 800 of a method of wireless communication. A user generated emergency call 802 may result in a request for service 804 when UE 702 is performing a NAU. An ESR 806 (NAS request) results in an over-the-air (OTA) message 808 transmitted to the network. The network typically responds 810 with either a TAU result or ESR result, which may be passed to a handler as message 812.

With reference again to FIG. 7, in some embodiments, delays in processing an emergency CSFB call can be minimized by permitting the TAU process and ESR to run simultaneously. MME 706 may handle ESR when handling TAU and if MME 706 has not completed TAU processing, MME 706 may abort the TAU process in order to expedite the ESR. In one example, UE 702 receives a response to the ESR from MME 706 and aborts the TAU procedure. The UE 702 may then proceed with handling the ESR response. UE 702 may queue a TAU process, change a state or parameter, and/or initiate a task, flag, or other indicator that cause UE 702 to initiate a TAU process upon completion of the CSFB emergency call and return of the UE 702 to the LTE network. Upon acquisition of LTE service, the UE 702 typically initiates a TAU process.

When MME 706 handles ESR and TAU concurrently, a TAU result may be transmitted by MME 706 before the ESR for the emergency call is processed. UE 702 may confirm delivery of the TAU response by sending a TAU complete message and MME 706 may assume that UE 702 has not received the TAU response if the TAU complete message is not received by MME 706, and MME 706 may consider the TAU process to be aborted if the TAU complete is not received.

The UE 702, upon receiving a TAU result before a response to the ESR, UE 702 may handle the TAU result and assume TAU is updated and if a TAU complete message is not required from the UE 702. Otherwise, UE 702 may assume that the TAU process has been aborted and typically initiates a TAU process after returning to LTE after the CSFB emergency call.

In some embodiments, delays in processing an emergency CSFB call can be minimized by aborting the TAU process and initiating ESR handling. MME 706 may abort an incomplete TAU process, including a TAU process that is incomplete only because a TAU complete message has not yet been received. MME 706 may then handle the ESR for a CSFB emergency call. UE 702 may abort the TAU process and enter the ESR processing function. The UE 702 may ignore a TAU result received before a response to the ESR is received, and the UE 702 may continue to wait for the response to the ESR.

In some embodiments, the TAU process is aborted only if it is not directly related to a TA event, such as a change of TA. When the UE 702 has changed TA and has initiated a TAU process, the UE 702 may buffer the ESR and process it after TAU is complete. If the TAU process relates to some function other than TA change, the TAU process may be aborted and the ESR for CSFB emergency call may be processed.

Figure 9:
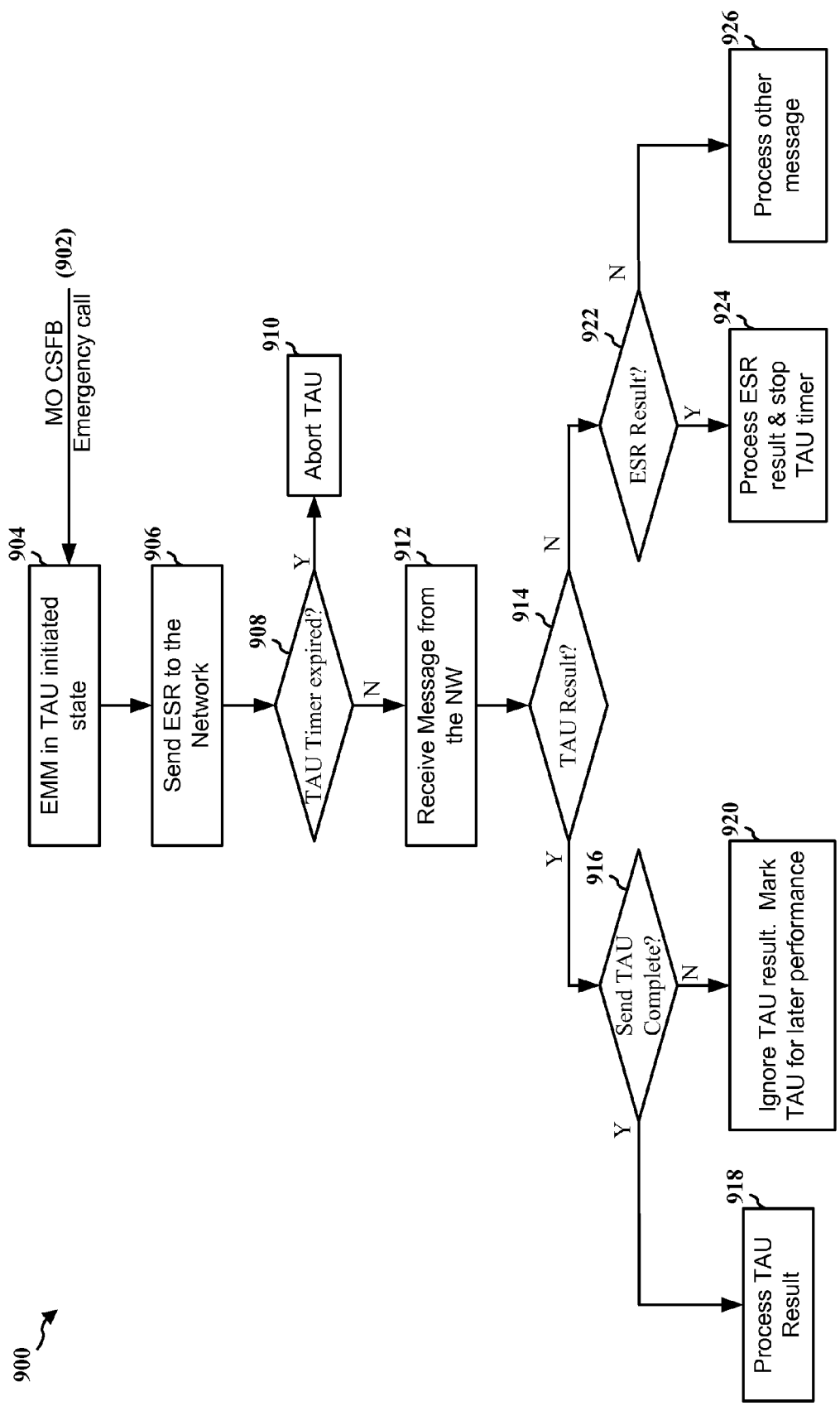
FIG. 9 is a flow chart of a method of wireless communication.

FIG. 9 is a flow chart 900 of a method of wireless communication. A method for expediting a requested emergency call is initiated when a request for emergency call establishment 902 is generated at the UE 702 while the EMM is in a TAU initiated state 904. At step 906, UE 702 transmits an ESR to the network. At step 910, the UE 702 may abort the TAU if the TAU timer is determined to have expired at step 908. A message from the network may be received by the UE 702 at step 912. At step 914, UE 702 may optionally determine if the message is a TAU result. If the TAU timer has not expired and a TAU result has been received, the UE 702 may determine at step 916 whether a TAU complete should be sent. If a TAU complete message is determined to be needed, the UE 702 may transmit the TAU complete and process the TAU result at step 918. Otherwise, at step 920 may ignore the TAU result and may set a flag or otherwise mark the TAU to cause the TAU to be performed after the CSFB is completed. If at step 914, it is determined that a TAU result was not received, the UE 702 may determine at step 922 whether the message is an ESR result. At step 924, the UE 702 may process the ESR result and halt the TAU timer, if needed. At step 926, the UE 702 may process a different message, when the message is determined not to be an ESR result.

Figure 10:
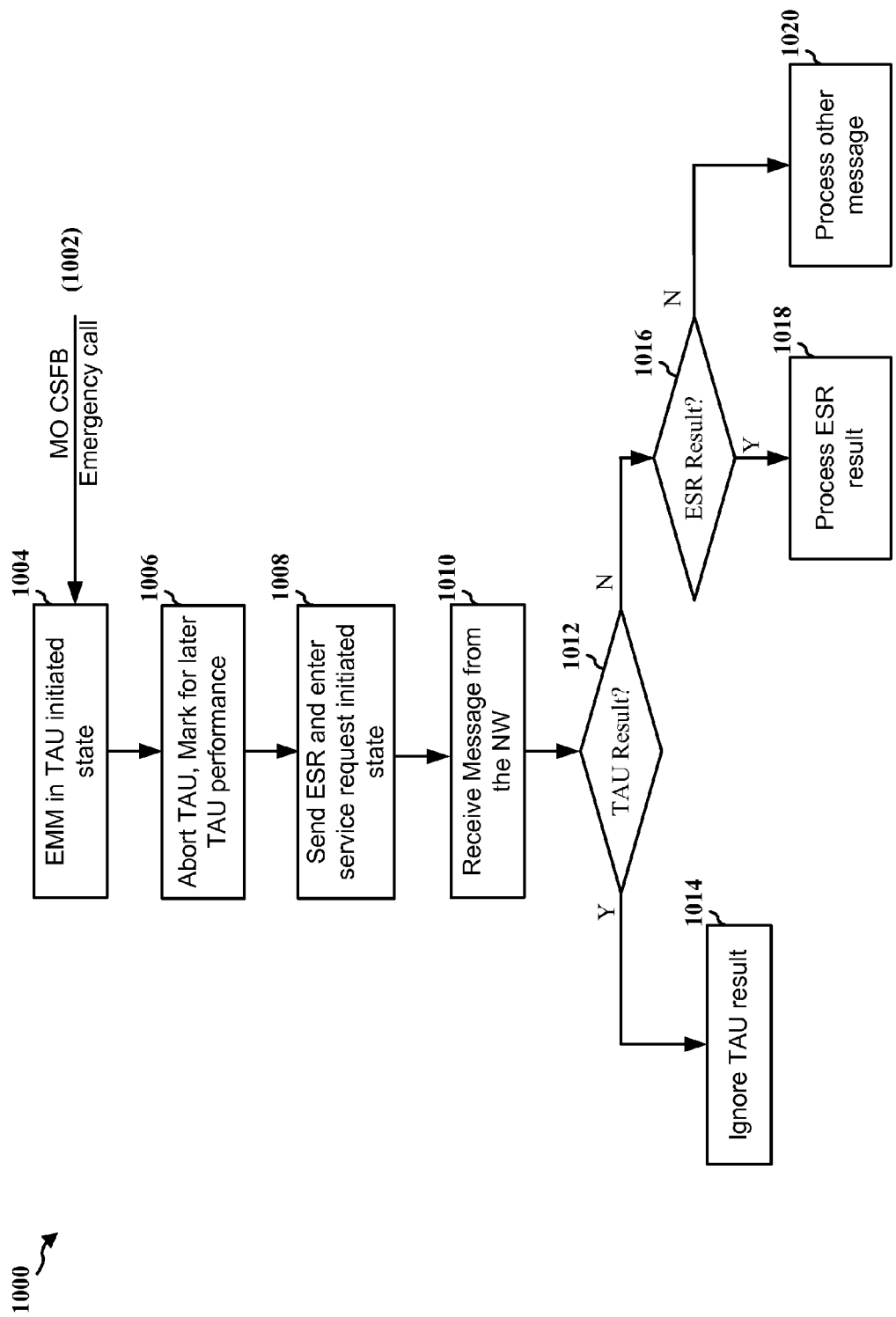
FIG. 10 is a flow chart of a method of wireless communication.

FIG. 10 is a flow chart 1000 of a method of wireless communication. A method for expediting a requested emergency call is initiated when a request for emergency call establishment 1002 is generated at the UE 702 while the EMM is in a TAU initiated state 1004. At step 1006, the UE 702 aborts the TAU and may set a flag or otherwise mark the TAU to cause the TAU to be performed after the CSFB is completed. At step 1008, UE 702 transmits an ESR to the network. At step 1010, the UE 702 receives a message from the network. At step 1012, UE 702 may determine if the message is a TAU result. If a TAU result is determined at step 1012, UE 702 may ignore the TAU result at step 1014. If the message is not a TAU result, then UE 702 may determine at step 1016 whether the message is an ESR result. At step 1018, the UE 702 may process the ESR result. At step 1020, the UE 702 may process a different message, when the message is determined not to be an ESR result.

Figure 11:
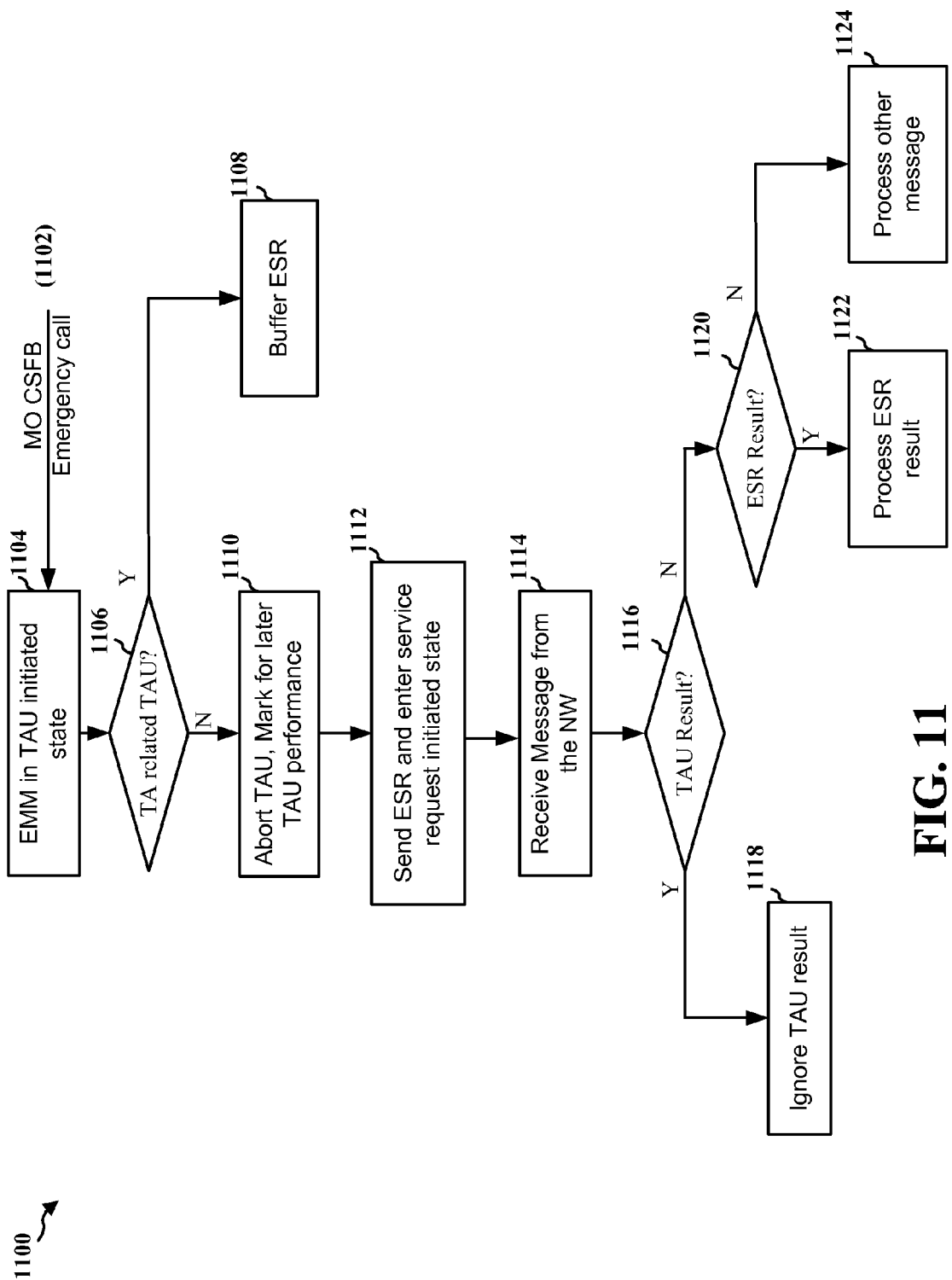
FIG. 11 is a flow chart of a method of wireless communication.

FIG. 11 is a flow chart 1100 of a method of wireless communication. A method for expediting a requested emergency call is initiated when a request for emergency call establishment 1102 is generated at the UE 702 while the EMM is in a TAU initiated state 1104. The UE 702 may determine at step 1106 whether the TAU is related to a TA change. If step 1106 determines that the TAU is the result of a TA change, then the UE 702 may buffer the ESR as shown by step 1108, or otherwise delay transmitting the ESR. If the TAU is determined to be unrelated to a TA change, then the UE 702 may abort the TAU at step 1110, and UE 702 may set a flag or otherwise mark the TAU to cause the TAU to be performed after the CSFB is completed. At step 1112, UE 702 transmits an ESR to the network. The UE 702 may enter a request initiated state. At step 1114, the UE 702 receives a message from the network. At step 1116, UE 702 may determine if the message is a TAU result. If a TAU result is determined at step 1116, UE 702 may ignore the TAU result at step 1118. If the message is not a TAU result, then UE 702 may determine at step 1120 whether the message is an ESR result. At step 1122, the UE 702 may process the ESR result. At step 1124, the UE 702 may process a different message, when the message is determined not to be an ESR result.

Figure 12:
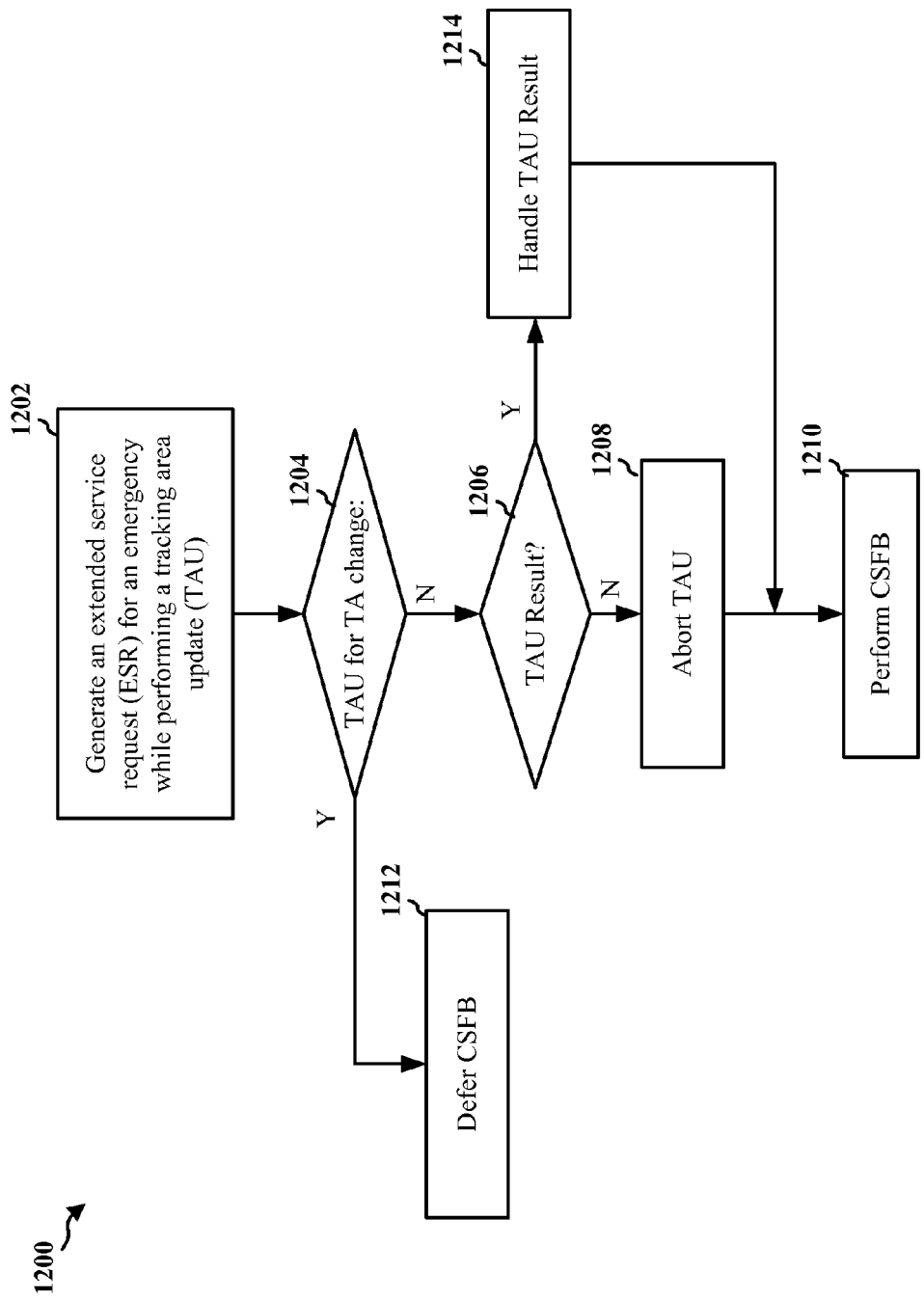
FIG. 12 is a flow chart of a method of wireless communication.

FIG. 12 is a flow chart 1200 of a method of wireless communication. The method may be performed by a UE 702. At step 1202, the UE 702 generates an ESR for transmission while performing a TAU. The ESR may relate to an emergency call.

At step 1204, the UE 702 may determine whether the TAU is related to a TA change. If the TAU is not related to a TA change, the UE 702 may abort the TAU at step 1208. If the TAU is not related to a TA change, the UE 702 may transmit the ESR. In some embodiments, the UE 702 may defer transmitting the ESR at step 1212, if the TAU is related to a TA change until the TAU is complete. In some embodiments, the UE 702 may transmit the ESR regardless of the purpose of the TAU.

At step 1206, the UE 702 may optionally determine if a result of the TAU has been received. If the result was received, the UE 702 may optionally handle the TAU at step 1214 before performing a CSFB at step 1210. MME 706 may require that the UE 702 send a TAU complete message or the MME 706 may assume that the TAU was abandoned. The CSFB procedure may be performed after the response to the ESR is received. In some embodiments, the TAU is aborted at step 1208 if a TAU result was not received. A TAU result may be ignored if it is received after the UE 702 transmits the ESR.

In some embodiments, the UE 702 buffers the ESR, or otherwise delays transmitting the ESR until after the TAU is completed. The ESR may be buffered when the TAU is related to a TA change.

At step 1210, the UE 702 initiates and/or performs a CSFB procedure before completing the TAU. The UE 702 may terminate the TAU prior to performing the CSFB procedure. Performing a CSFB procedure may include establishing a CSFB emergency call in response to the ESR. The UE 702 may perform a new TAU after the CSFB procedure is completed.

In some embodiments, transmitting the ESR includes determining whether the TAU is related to a change in TA, aborting the TAU when the TAU is not related to the change in TA, and refraining from transmitting the ESR until completion of the TAU when the TAU is related to the change in TA.

Figure 13:
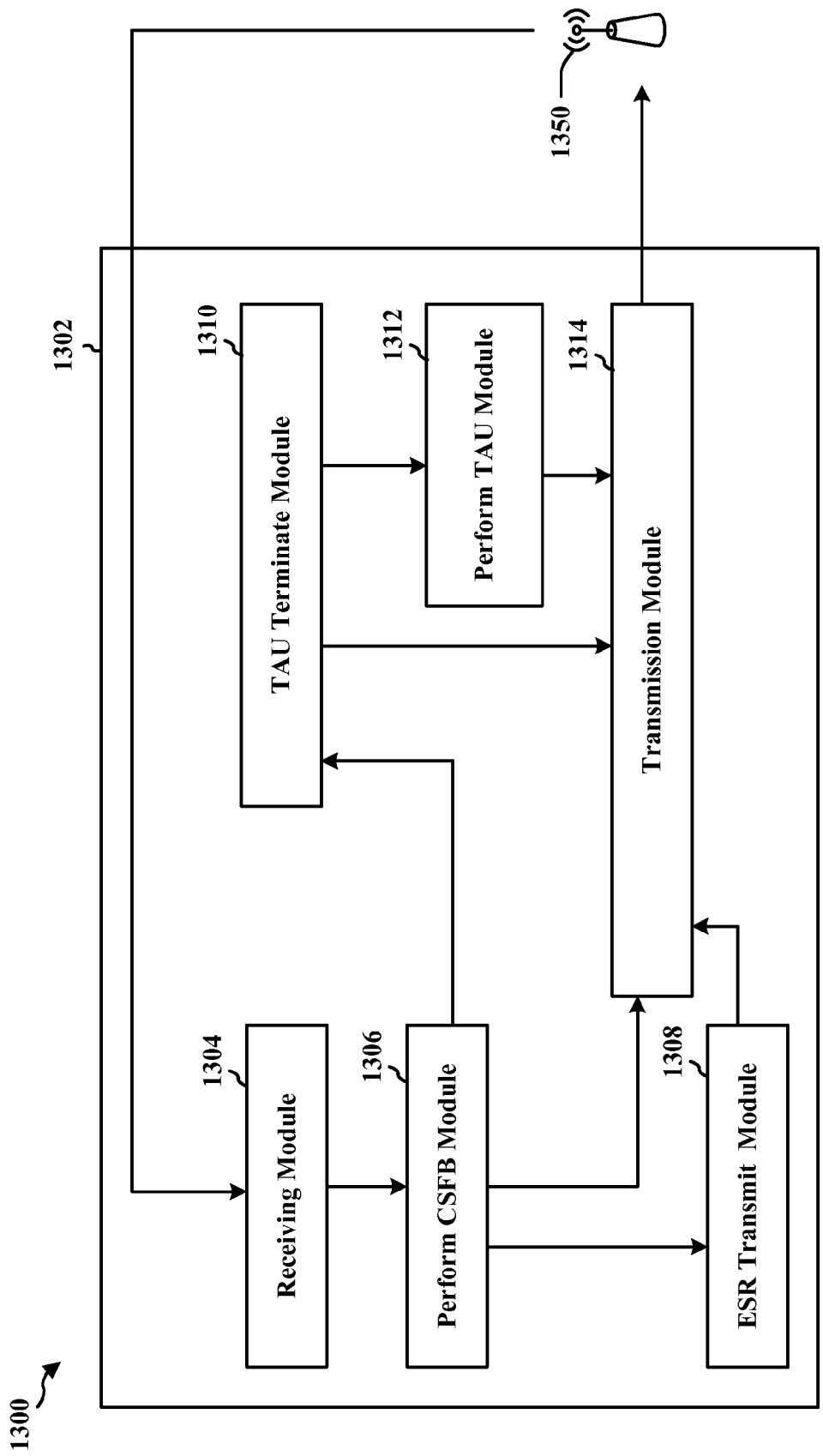
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus may be a UE 702. The apparatus includes a module 1304 that receives and processes commands and information from an MME 706, a module 1306 that performs a CSFB procedure, a module 1308 that generates and transmits ESRs, a TAU terminate module 1310 that performs the logic necessary to terminate a TAU in progress, a module 1312 that performs a TAU, and a transmission module 1314 that selectively communicates requests to the MME 706. The transmission module 1314 is also connected to a transmitter 1350.

The apparatus may include additional modules that perform each of the steps of the algorithm in the aforementioned flow charts of FIGS. 9, 10, 11, and 12. As such, each step in the aforementioned flow charts of FIGS. 9, 10, 11, and 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
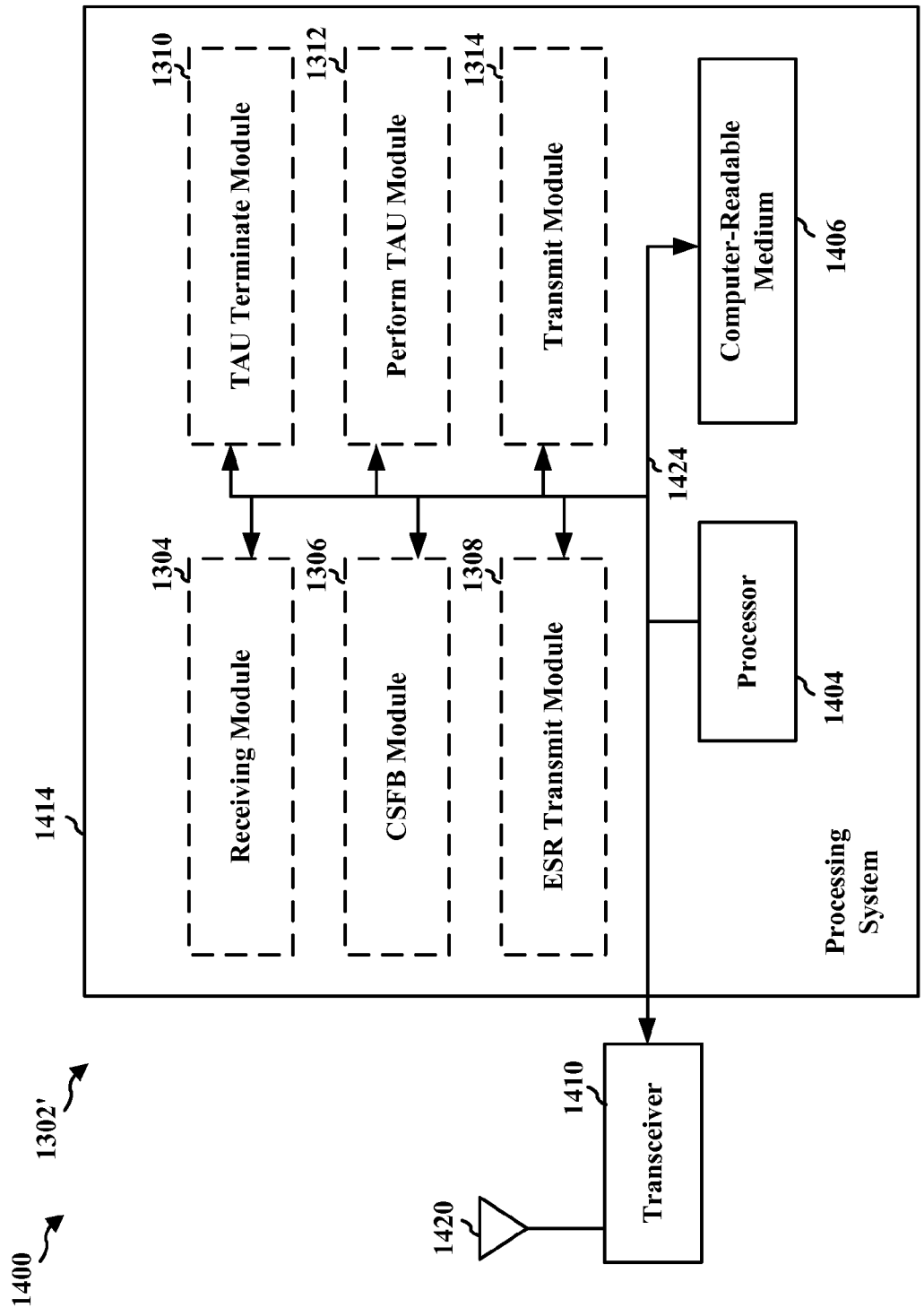
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1304, 1306, 1308, 1310, 1312, 1314, and the computer-readable medium 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system further includes at least one of the modules 1304, 1306, 1308, 1310, 1312, and 1314. The modules may be software modules running in the processor 1404, resident/stored in the computer readable medium 1406, one or more hardware modules coupled to the processor 1404, or some combination thereof. The processing system 1414 may be a component of the UE 650 and may include the memory 660 and/or at least one of the TX processor 668, the RX processor 656, and the controller/processor 659.

In one configuration, the apparatus 1302/1302' for wireless communication includes means 1304 that receives and processes commands and information from an MME 706, means 1306 that performs a CSFB procedure, means 1308 that generates and transmits ESRs, a TAU terminate means 1310 that performs the logic necessary to terminate a TAU in progress, means 1312 that performs a TAU, and a transmission means 1314 that selectively communicates requests o the MME 706. The aforementioned means may be one or more of the aforementioned modules of the apparatus 1302 and/or the processing system 1414 of the apparatus 1302' configured to perform the functions recited by the aforementioned means. As described supra, the processing system 1414 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   transmitting an extended service request (ESR) while performing a tracking area update (TAU), wherein the ESR relates to an emergency call;
   performing a circuit-switched fallback (CSFB) procedure; and
   terminating the TAU prior to performing the CSFB procedure when an ESR response is received prior to receiving a TAU result.

2. A method of wireless communication, comprising:
   transmitting an extended service request (ESR) while performing a tracking area update (TAU), wherein the ESR relates to an emergency call;
   performing a circuit-switched fallback (CSFB) procedure; and
   terminating the TAU prior to performing the CSFB procedure when the TAU is not related to a change in tracking area (TA).

3. The method of claim 1, further comprising scheduling a new TAU, wherein the new TAU is to be performed after the CSFB procedure is completed.

4. The method of claim 1, wherein performing a CSFB procedure includes establishing a CSFB emergency call in response to the ESR, and further comprising performing a new TAU after the CSFB procedure is completed.

5. The method of claim 1, wherein terminating the TAU includes ignoring a TAU response after transmitting the ESR.

6. The method of claim 1, wherein terminating the TAU includes ignoring a TAU response after initiating the CSFB procedure.

7. The method of claim 2, further comprising determining whether the TAU is related to a change in TA.

8. A method of wireless communication, comprising:
   transmitting an extended service request (ESR) for an emergency call while performing a tracking area update (TAU);
   determining whether the TAU is related to a change in TA; and aborting the TAU and performing a circuit-switched fallback (CSFB) procedure before completing the TAU when the TAU is determined to be not related to a change in TA.

9. The method of claim 8, wherein transmitting the ESR includes delaying transmitting the ESR until the TAU is completed when the TAU is determined to be related to a change in TA.

10. The method of claim 9, wherein transmitting the ESR includes buffering the ESR.

11. The method of claim 8, wherein transmitting the ESR includes refraining from transmitting the ESR until completion of the TAU when the TAU is related to a change in TA.

12. An apparatus for wireless communication, comprising:
means for transmitting an extended service request (ESR) while performing a tracking area update (TAU), wherein the ESR relates to an emergency call;
means for performing a circuit-switched fallback (CSFB) procedure; and
means for terminating the TAU prior to performing the CSFB procedure when an ESR response is received prior to receiving a TAU result.

13. An apparatus for wireless communication, comprising:
means for transmitting an extended service request (ESR) while performing a tracking area update (TAU), wherein the ESR relates to an emergency call;
means for performing a circuit-switched fallback (CSFB) procedure; and
means for terminating the TAU prior to performing the CSFB procedure when the TAU is not related to a change in tracking area (TA).

14. The apparatus of claim 12, wherein the means for terminating the TAU is configured to schedule a new TAU, wherein the new TAU is to be performed after the CSFB procedure is completed.

15. The apparatus of claim 12, wherein the means for performing a CSFB procedure is configured to establish a CSFB emergency call in response to the ESR, and cause a new TAU to be performed after the CSFB procedure is completed.

16. The apparatus of claim 12, wherein the means for terminating the TAU is configured to ignore a TAU response after transmitting the ESR.

17. The apparatus of claim 12, wherein the means for terminating the TAU is configured to ignore a TAU response after initiating the CSFB procedure.

18. An apparatus for wireless communication, comprising:
means for transmitting an extended service request (ESR) for an emergency call while performing a tracking area update (TAU);
means for determining whether the TAU is related to a change in TA;
means for performing a circuit-switched fallback (CSFB) procedure; and
means for terminating the TAU prior to performing the CSFB procedure when the TAU is not related to a change in TA.

19. The apparatus of claim 18, wherein the TAU is terminated when the TAU is determined to be not related to a change in TA.

20. The apparatus of claim 18, wherein the means for transmitting the ESR is configured to delay transmitting the ESR until the TAU is completed when the TAU is determined to be related to a change in TA.

21. The apparatus of claim 20, wherein the means for transmitting the ESR is configured to buffer the ESR.

22. The apparatus of claim 18, wherein the means for transmitting the ESR is configured to terminate the TAU when the TAU is not related to a change in TA, and refrain from transmitting the ESR until completion of the TAU when the TAU is related to a change in TA.

23. An apparatus for wireless communication, comprising:
a non-transitory computer-readable medium; and
at least one processor coupled to the computer-readable medium and configured to:
transmit an extended service request (ESR) while performing a tracking area update (TAU), wherein the ESR relates to an emergency call;
perform a circuit-switched fallback (CSFB) procedure; and
terminate the TAU prior to performing the CSFB procedure when an ESR response is received prior to receiving a TAU result.

24. A computer program product, comprising:
a non-transitory computer-readable medium comprising code for:
transmitting an extended service request (ESR) while performing a tracking area update (TAU), wherein the ESR relates to an emergency call;
performing a circuit-switched fallback (CSFB) procedure; and
terminating the TAU prior to performing the CSFB procedure when the TAU is not related to a change in tracking area (TA).

25. A method of wireless communication, comprising:
receiving an extended service request (ESR) from a user equipment (UE) while performing a tracking area update (TAU), wherein the ESR relates to an emergency call; and
initiating a circuit-switched fallback (CSFB) procedure,
wherein the TAU is terminated prior to performing the CSFB procedure when the TAU is not related to a change in tracking area (TA).

26. The method of claim 25, further comprising sending an ESR response to the UE acknowledging the ESR.

27. The method of claim 26, wherein sending the ESR response to the UE causes the UE to terminate the TAU.

28. The method of claim 26, further comprising transmitting a TAU result received before the ESR response is sent to the UE.

29. An apparatus for wireless communication, comprising:
means for receiving an extended service request (ESR) from a user equipment (UE) while performing a tracking area update (TAU), wherein the ESR relates to an emergency call; and
means for initiating a circuit-switched fallback (CSFB) procedure,
wherein the TAU is terminated prior to performing the CSFB procedure when the TAU is not related to a change in tracking area (TA).

30. The apparatus of claim 29, further comprising means for sending an ESR response to the UE acknowledging the ESR.

31. The apparatus of claim 30, wherein the UE terminates the TAU when the UE receives the ESR response.

32. The apparatus of claim 30, further comprising means for transmitting a TAU result received before the ESR response is sent to the UE.

33. An apparatus for wireless communication, comprising:
a non-transitory computer-readable medium;
at least one processor coupled to the computer-readable medium and configured to:

receive an extended service request (ESR) from a user equipment (UE) while performing a tracking area update (TAU), wherein the ESR relates to an emergency call; and initiate a circuit-switched fallback (CSFB) procedure, wherein the TAU is terminated prior to performing the CSFB procedure when an ESR response is received prior to receiving a TAU result.

34. A computer program product, comprising:

a non-transitory computer-readable medium comprising code for:

receiving an extended service request (ESR) from a user equipment (UE) while performing a tracking area update (TAU), wherein the ESR relates to an emergency call; and initiating a circuit-switched fallback (CSFB) procedure, wherein the TAU is terminated prior to performing the CSFB procedure when the TAU is not related to a change in tracking area (TA).

* * * * *